N. Burk,
Leather Machine.
Nº 21,114.  Patented Aug. 10, 1858.
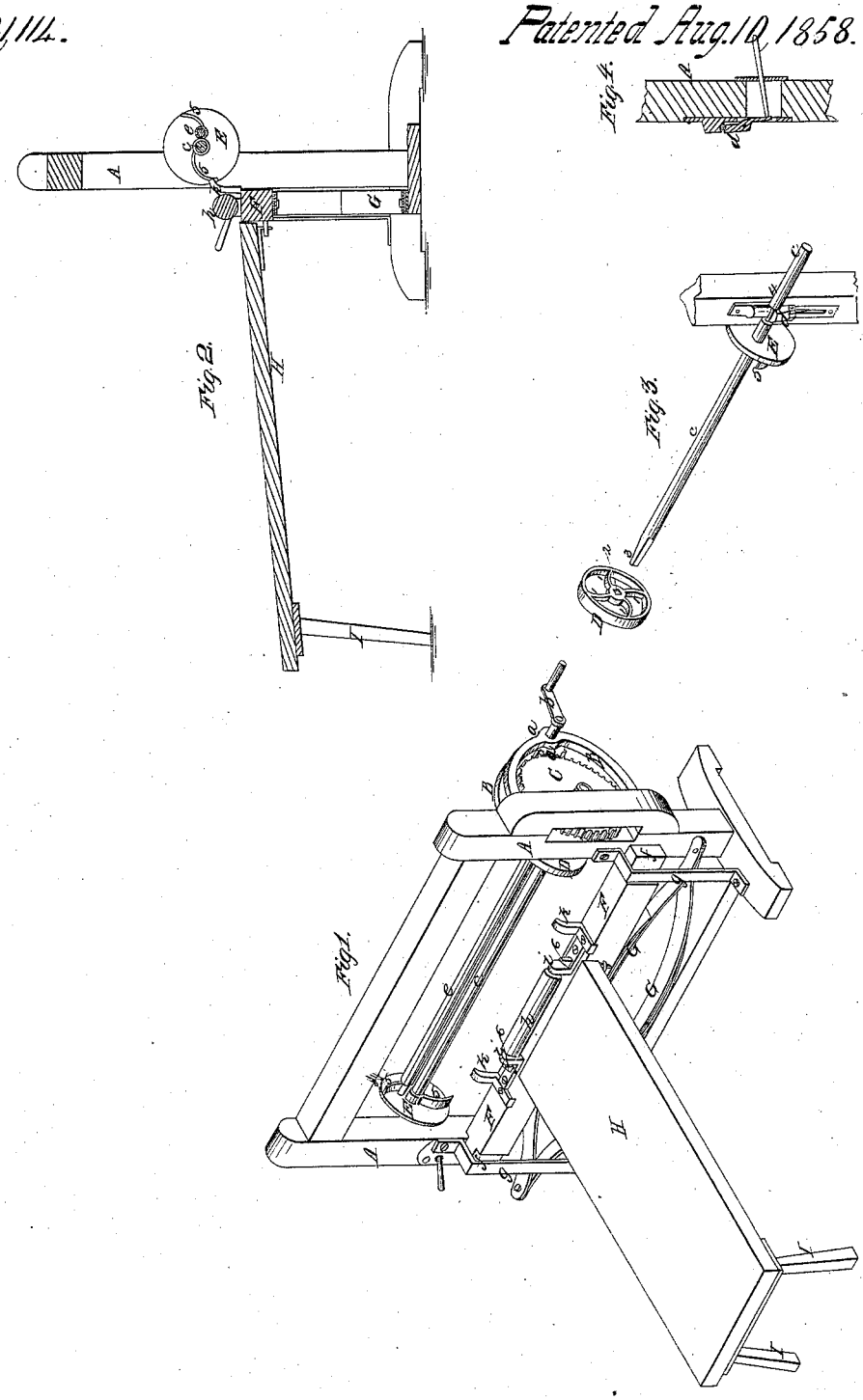

UNITED STATES PATENT OFFICE.

N. BURK, OF FULTON, NEW YORK.

MACHINE FOR ROLLING LEATHER INTO BALES.

Specification of Letters Patent No. 21,114, dated August 10, 1858.

*To all whom it may concern:*

Be it known that I, NATHAN BURK, of Fulton, in the county of Oswego and State of New York, have invented certain new and useful Improvements in Machines for Rolling Up and Securing Leather in Bales or Bundles; and I do hereby declare the following to be a full, clear, and exact description of the construction and operation of the same, reference being had to the accompanying drawings, making a part of this specification, in which—

Figure 1 represents a perspective view. Fig. 2 represents a longitudinal vertical section, and Figs. 3 and 4, represent detached portions of the machine which will be more specially referred to.

Similar letters of reference where they occur in the several figures denote like parts of the machine in all of them.

To enable others skilled in the art to make and use my invention, I will proceed to describe the same with reference to the drawings.

A, represents an upright frame, to which is hung by suitable brackets or bearings B, a pinion $a$, to the shaft of which a crank $b$ is secured, for giving motion to said pinion. The pinion $a$ drives a cogged wheel C, supported on the frame A, and on the end of the shaft of the cog wheel C, there is a flanged disk or wheel D (better seen at Fig. 3) having four curved arms 1, running from its hub or center to the perimeter, and the center or hub provided with a square hole 2, into which the square end 3, of the shaft $c$, can enter, said shaft $c$, extending clear across the frame, and the end 4 of it, supported in a bearing $d$, Figs. 3, 4, from which it can be readily released. Near the end 4 of this shaft, and facing the wheel D, there is a similar wheel E, having but two curved arms 5.

$e$, is a clamping bar or rod the ends of which are placed in or against the curved arms in the two disk wheels D E, and it is thus rotated with said disks and their shaft $c$.

F, is a cross beam, resting upon a spring G, said beam having tenons $f$, on each of its ends, which move in guides $g$, to keep it in proper position. A roller $h$, is hung in supports $i$, $i$, on this cross beam F, and immediately outside of these supports $i$, are what I call string guides 6, which hold the strings in proper position while the bale or bundle is being formed; to fasten or tie it, when formed. Beyond these string guides 6, on the cross beam, are placed the stops, or leather guides $k$, which prevents the leather as it is being wound up, from skewing, and thus making the bale uneven.

H, is a bench or table, one end of which is supported on the cross beam F, and the other end on ordinary legs I, I. This table is for supporting the leather and having it properly baled up. As the bale increases in diameter the table presses upon the spring G, which yields, and thus allows it to be always tangential to the bale, and the skins are thus always in the plane or line in which they are to be taken and rolled up.

The operation is as follows: The ends of the hides are passed over and between the rods or shafts $c$, $e$, and the crank $b$, is turned, which through the pinion $a$, and gear wheel C, rotates said two rods or shafts, and they clamping the ends of the hides between them, wind them around themselves into a bale or bundle. The spring G, under the table, forces the roller $h$, and the hides drawn over it, hard up against the bale or bundle, and thus compresses it into a very small compass. When the bale is formed, which is usually composed of some 10 or 12 hides, which are kept in line by the stops, or guides $k$, the strings which had been previously placed along side of the string guides 6, are brought around the bale or bundle and tied. The latch bearing $d$ is then loosened, the bending or clamping rods, and the bale removed. The rods are then drawn out of the bale, and replaced in the machine for another succeeding operation of the same kind, one person being able to do with this machine what is ordinarily the work of three or four persons by hand baling.

Having thus fully described the nature of my invention, what I claim therein as new, and desire to secure by Letters Patent is—

In combination with the winding and clamping shafts, the spring table with its friction roller, stops, and string guides, arranged and operating together in the manner and for the purpose herein set forth.

NATHAN BURK.

Witnesses:
A. B. STOUGHTON,
E. COHEN.